(12) United States Patent
Lee et al.

(10) Patent No.: US 7,658,892 B2
(45) Date of Patent: Feb. 9, 2010

(54) PIPE SHAPED REFORMER HAVING RUGGED INTERNAL SURFACE

(75) Inventors: Chan Ho Lee, Yongin (KR); Ju Yong Kim, Seoul (KR); Sang Jun Kong, Yongin (KR); Dong Yun Lee, Yongin (KR); Sung Chul Lee, Yongin (KR); Dong Myung Suh, Yongin (KR); Myeong Ju Ha, Yongin (KR); Dong Uk Lee, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 392 days.

(21) Appl. No.: 11/440,664

(22) Filed: May 24, 2006

(65) Prior Publication Data
US 2006/0292045 A1 Dec. 28, 2006

(30) Foreign Application Priority Data
Jun. 24, 2005 (KR) .................. 10-2005-0055309

(51) Int. Cl.
B01J 19/00 (2006.01)
B01J 8/04 (2006.01)
(52) U.S. Cl. .................. 422/189; 422/198; 48/61
(58) Field of Classification Search .......... 48/189, 48/198
See application file for complete search history.

(56) References Cited

U.S. PATENT DOCUMENTS 6,413,479 B1 * 7/2002 Kudo et al. .......... 422/198

2006/0021280 A1 * 2/2006 Hamilton et al. ........ 48/127.9
2006/0051261 A1 * 3/2006 Rong et al. ............. 422/198

FOREIGN PATENT DOCUMENTS

| JP | 11-43304 | 2/1999 |
|----|----------|--------|
| JP | 11-322302 | 11/1999 |
| JP | 2002-187705 | 7/2002 |
| JP | 2004-299939 | 10/2004 |
| WO | WO 2005000737 A1 * | 1/2005 |

OTHER PUBLICATIONS

Patent Abstract of Japan, Publication No. 2002-187705, Published on Jul. 5, 2002, in the name of Komiya, et al.
Patent Abstract of Japan, Publication No. 2004-299939, Published on Oct. 28, 2004, in the name of Senda.
Patent Abstracts of Japan, Publication No. 11-043304, dated Feb. 16, 1999, in the name of Yoshinori Tokunaga et al.
Patent Abstracts of Japan, Publication No. 11-322302, dated Nov. 24, 1999, in the name of Osamu Tajima et al.

* cited by examiner

*Primary Examiner*—Jennifer K Michener
*Assistant Examiner*—Imran Akram
(74) *Attorney, Agent, or Firm*—Chrisite, Parker & Hale, LLP

(57) ABSTRACT

A reformer is disclosed for supplying a reformed gas containing hydrogen to a fuel cell. The reformer comprises a heat source; a preheating portion preheated by heat from the heat source; a pipe shaped reforming reaction unit; a carbon monoxide processing unit extending from the reforming reaction unit; and a rugged portion installed on an internal surface of the pipe shaped reforming reaction unit which is heated by the heat source. By using the rugged portion and the extended pipe design, the area heated by the heat source is increased and more heat is recovered, thereby improving thermal efficiency.

12 Claims, 4 Drawing Sheets

PIPE SHAPED REFORMER HAVING RUGGED INTERNAL SURFACE

CROSS-REFERENCE TO RELATED APPLICATIONS

This application claims priority to and the benefit of Korean Patent Application No. 10-2005-0055309, filed on Jun. 24, 2005, in the Korean Intellectual Property Office, the disclosure of which is incorporated herein by reference.

FIELD OF THE INVENTION

The invention relates to a reformer, and more particularly, to a reformer for a fuel cell which can improve thermal efficiency and easily control the reaction temperature of each reaction zone.

BACKGROUND

A fuel cell is a power generation system for generating electric energy by electrochemically reacting hydrogen and oxygen. According to the type of electrolyte used, a fuel cell can be characterized as a phosphoric acid fuel cell, a molten carbonate fuel cell, a solid oxide fuel cell, a polymer electrolyte fuel cell, an alkaline fuel cell, etc. These respective fuel cells are generally operated based on the same principle, but are different in view of types of fuels used, operating temperatures, catalysts and electrolytes, etc. Among the different types, the polymer electrolyte membrane fuel cell (PEMFC) has the advantages of remarkably high output characteristics, low operating temperature characteristics, and rapid starting and responding characteristics over other fuel cells, and is widely applicable as a mobile power source for portable electronic equipment, and automobiles, as well as a distributed power source in homes and public buildings, etc.

Since hydrogen has the best reactivity in the electrochemical oxidation reaction at the anode electrode, and does not exhaust polluting substances because it generates water after reacting with oxygen, it is the most suitable substance as a fuel for a fuel cell. However, since hydrogen rarely exists in a readily available form, it must often be obtained by reforming other raw materials. For example, hydrogen can be obtained from hydrocarbon-based fuels, such as gasoline, diesel, methanol, ethanol, natural gas, etc., through a reformer. Hydrogen can also be obtained by reforming a fuel such as butane which is readily available on the market and can be provided in pressurized cans. Therefore, supposing that a butane can is used as a fuel supply for a fuel cell, it has the advantage that the hydrogen containing fuel can be easily obtained, and fuel can be supplied by using the internal pressure of the butane can, without using a compressor.

Meanwhile, in the reformer, the range of the reaction temperature to be required in each reaction zone differs according to the reacting catalysts installed in each reaction zone. For example, the range of the reaction temperature in a steam reforming (SR) reaction is different depending on the reforming raw material, i.e., approximately from 600° C. to 900° C. for hydrocarbon-based fuels such as butane, and approximately from 250° C. to 400° C. for a fuel such as methanol. The range of the reaction temperature in a water gas shift (WGS) reaction, one of the processes for removing carbon monoxide, is approximately 200° C. to 350° C., and the range of the reaction temperature in a preferential CO oxidation (PROX) reaction is approximately 100° C. to 250° C. The range of the reaction temperatures in each reaction zone in the reformer in decreasing order is: the reforming reaction unit, the shift reaction unit (or water-gas-shift reaction unit), and the preferential CO oxidation unit.

As described above, in a reformer that is reforming hydrocarbon-based fuel such as butane, it is difficult to properly control the reactions in each reaction zone because the differences in the reaction temperatures of each reaction zone are larger than for a reformer using methanol fuel. Therefore, in a reformer using a fuel such as butane, there is a need to have rapid preheating with high thermal efficiency while properly controlling the reaction temperatures of each reaction zone.

SUMMARY OF THE INVENTION

Accordingly, in an embodiment of the invention, a reformer is provided for generating a reformed gas containing hydrogen from a fuel including butane, wherein the reformer is rapidly preheated and the temperature of each reaction zone is easily controlled. To improve the steam reforming efficiency of the butane fuel, rugged portions are provided on the interior of a pipe shaped reformer which may be provided as a hollow cylinder.

One embodiment of the invention provides a reformer comprising a heat source generating heat by combustion of a fuel; a preheating portion arranged at a position able to be preheated by heat from the heat source and which mixes and preheats raw materials and water; a pipe shaped reforming reaction unit heated by the heat source in which the raw materials are steam reformed to produce the reformed gas containing hydrogen as a principal component; a carbon monoxide processing unit extending in a pipe shape from the reforming reaction unit for decreasing the amount of carbon monoxide contained in the reformed gas produced in the reforming reaction unit; and further including an internal surface of the pipe shaped reforming reaction unit with a rugged portion that is heated by the heat source and which provides improved heat transfer.

In another embodiment, an internal surface of the carbon monoxide processing unit further includes a rugged portion.

In a further embodiment, the rugged portion comprises a plurality of protrusions, wherein the heights of the individual protrusions decrease from the reforming reaction unit to the carbon monoxide processing unit.

In an embodiment, the reforming reaction unit comprises a pipe having a cross section with one or more protrusions corresponding to the rugged portion, and further comprises a catalyst in the pipe, and is provided in a cylindrical shape by winding the pipe in a spiral form.

In one embodiment, the heat source is capable of sliding or reciprocating within the hollow portion of the pipe shaped reforming reaction unit.

In an embodiment, the carbon monoxide processing unit extends in a pipe shape from the reforming reaction unit with a heat shielding portion therebetween.

In another embodiment, the carbon monoxide processing unit extends in a pipe shape from the reforming reaction unit with a stepped portion therebetween.

In yet another embodiment, the cross sectional area/diameter of a hollow portion of the carbon monoxide processing unit is greater than the cross sectional area/diameter of a hollow portion of the reforming reaction unit.

In a further embodiment, the carbon monoxide processing unit comprises a shift reaction unit for decreasing the carbon monoxide contained in the reformed gas produced in the reforming reaction unit by the water-gas-shift reaction, and a CO oxidation unit for further decreasing the carbon monoxide contained in the reformed gas treated in the shift reaction unit by oxidation.

In one embodiment, the CO oxidation unit extends in a cylindrical shape into the external surface of the reaction zone for the shift reaction unit, and the reformer further comprises a cooler for lowering the reaction temperature of the CO oxidation unit.

In an embodiment, the preheating portion comprises a spiral pipe installed facing the heat source with a hollow portion of the reforming reaction unit therebetween.

In one embodiment, the heat source comprises a burner for discharging flames to a hollow portion of the reforming reaction unit.

In another embodiment, the reformer further comprises a cover covering the preheating portion and the reforming reaction unit.

One embodiment of the invention provides a reformer comprising a pipe shaped reforming reaction unit having a hollow portion; a heat source supplying heat to the reforming reaction unit via the hollow portion; and an internal surface of the reforming reaction unit with a rugged portion.

BRIEF DESCRIPTION OF THE DRAWINGS

These and/or other objects and advantages of the invention will become apparent and more readily appreciated from the following description of exemplary embodiments, taken in conjunction with the accompanying drawings of which.

DETAILED DESCRIPTION

Figure 1:
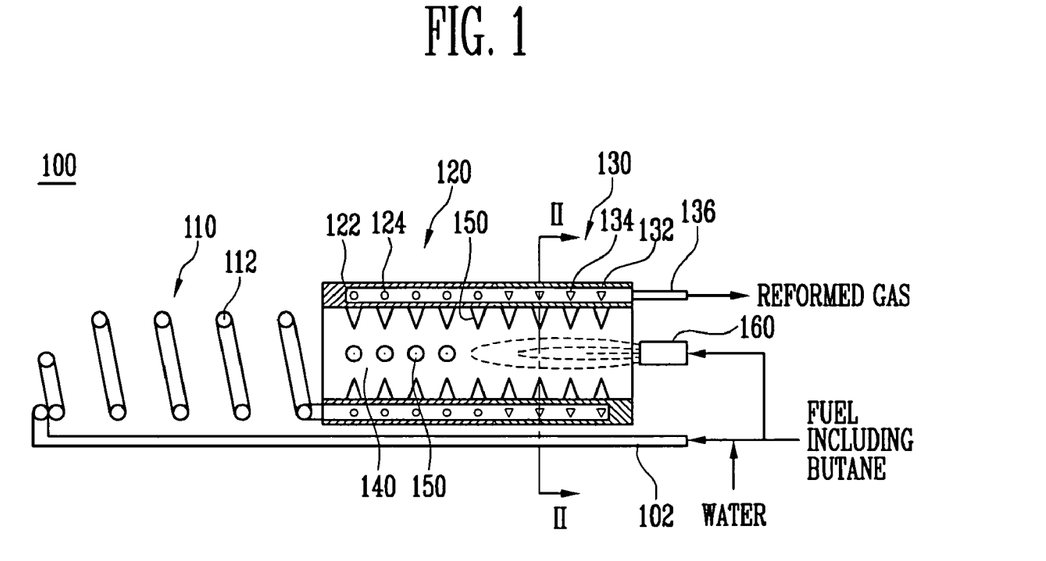
FIGS. 1-8 are cross-sectional views of reformers according to various embodiments of the invention.

Hereinafter, embodiments of the invention will be described in a more detailed manner with reference to the accompanying drawings such a person having ordinary skill in the art can easily carry out the invention,

FIG. 1 is a view of a reforming system according to one embodiment of the invention.

As shown in FIG. 1, the reformer 100 of this embodiment generates a reformed gas containing hydrogen by steam-reforming raw materials, such as a fuel containing butane supplied from a fuel supply system (not shown). The reformer 100 also decreases the concentration of carbon monoxide (CO) produced in the course of reforming. For this, the reformer 100 comprises a preheating portion 110, a reforming reaction unit 120, a carbon monoxide processing unit 130, a rugged portion 150 and a heat source 160.

More specifically, in this embodiment, the preheating portion 110 of the reformer 100 comprises a pipe 112 heated by flames generated from a heat source 160 or by air heated by the flames. In one embodiment, the pipe 112 is composed of a metal such as iron, aluminum or alloys of such metals. In another embodiment, the preheating portion 110 is installed in the vicinity of a hollow portion 140 in a pipe shaped reforming reaction unit 120, such that the pipe 112 is wound into spiral form. For example, in an embodiment, the central axis of the spiral preheating portion 110 is approximately matched with that of the reforming reaction unit 120. According to the aforementioned construction, the preheating portion 110 serves to properly mix the butane fuel with water flowing into an inlet 102, and to rapidly preheat it. The properly mixed and preheated butane fuel and water flow into the reforming reaction unit from the preheating portion 110.

In an embodiment, the reforming reaction unit 120 is composed of a pipe shaped member comprising a hollow portion 140 and is directly heated by flames discharged from a heat source 160 to the hollow portion 140, or by air heated by the flames. In one embodiment, the reforming reaction unit 120 comprises a first channel 122 through which the butane fuel and water flow from the preheating portion 110, and the inside of the first channel 122 is filled with a reforming catalyst layer 124 for a steam reforming (SR) reaction. In an embodiment, the reforming catalyst layer 124 comprises a catalyst selected from $Ni/Al_2O_3$, $Ru/ZrO_2$, $Ru/Al_2O_3$, $Ru/CeO_2$—$Al_2O_3$, etc., provided in granular form. In another embodiment, in order to prevent the granular catalyst from scattering, a screen or similar reticular body (not shown) can be installed between the vicinity of the inlet of the reforming reaction unit 120 and the carbon monoxide processing unit 130. In an embodiment, the pipe shaped member is made of a metal such as iron, aluminum, etc., or alloys containing one or more of such metals. The reforming reaction unit 120 may also be constructed of heat-resistant composite materials.

The steam reforming reaction for normal butane may be represented in reaction equation as follows:

$$n\text{—}C_4H_{10} + 8H_2O \leftrightarrow 4CO_2 + 13H_2 \qquad \text{Reaction 1}$$

In one embodiment, the carbon monoxide processing unit 130 is composed of a pipe shaped member comprising a hollow portion, and is designed to decrease the carbon monoxide content of the reformed gas exhausted from the reforming reaction unit 120 to a value below a predetermined concentration. In an embodiment, the reforming reaction unit 120 comprises a second channel 132 extending from the first channel 122 of the reforming reaction unit 120, through which the reformed gas passes. In an embodiment, the inside of the second channel 132 contains a catalyst layer 134 for decreasing the carbon monoxide contained in the reformed gas. In one embodiment, the catalyst layer 134 comprises a catalyst selected from $Cr_2O_3/Fe_3O_4$, $Cu/ZnO/Al_2O_3$, etc., and provided in the form of grains. In another embodiment, in order to prevent the catalyst in the form of grains from scattering, a screen or similar reticular body (not shown) can be installed between the reforming reaction unit 120 and the carbon monoxide processing unit 130 and in the vicinity of the outlet of the carbon monoxide processing unit 130. In an embodiment, the pipe shaped member used in the construction of the carbon monoxide processing unit 130 is similar or identical to that of the reforming reaction unit 120.

In one embodiment, the carbon monoxide processing unit 130 is composed of a water gas shift (WGS) reaction portion for shifting carbon monoxide into hydrogen and carbon dioxide by the addition of water. The water gas shift reaction may be represented by the following equation:

$$CO + H_2O \leftrightarrow CO_2 + H_2 \qquad \text{Reaction 2}$$

Also, in an embodiment, the carbon monoxide processing unit 130 is directly heated by flames discharged from the heat source 160, by air heated by the flames or by electric heat, and the carbon monoxide processing unit 130 has a reaction temperature relatively lower than that of the reforming reaction unit 120. In one embodiment, the reaction temperature of the carbon monoxide processing unit 130 is controlled to approximately 200° C. to 350° C.

In one embodiment, a rugged portion 150 is installed on internal surfaces of the pipe shaped reforming reaction unit 120 and carbon monoxide processing unit 130, is composed of the same or similar materials as the reforming reaction unit 120, and is heated by flames discharged from the heat source 160, or by air heated by the flames in order to rapidly transfer the heat to the reforming reaction unit 120. In an embodiment, the rugged portion 150 can be implemented as plurality of triangular pyramid shaped projections or protruding portions, or can be installed as an embossed or a pin shaped structure with a plurality of substantially hemispherical protruding portions. In an embodiment, the rugged portion 150 can be integral to the reforming reaction unit 120 and/or the carbon monoxide processing unit 130, or can be jointly installed to the member by welding, etc.

In one embodiment, the heat source 160 throws flames from the vicinity of carbon monoxide processing unit 130 toward the hollow portion 140 of the reforming reaction unit 120 and heats the preheating portion 110, the reforming reaction unit 120, and the carbon monoxide processing unit 130 by the flames and the air heated by the flames. In an embodiment, the heat source 160 can be implemented as a flame radiator such as a burner or a torch, etc. In this embodiment, a plurality of substantially hemispherical protruding portions are protruded on internal surfaces toward the center of the hollow portion 140 in the counter radiation direction.

By using such a flame radiator as the heat source in combination with the rugged portion on the internal surfaces of the reforming reaction unit and the carbon monoxide processing unit 130 as described above, the area heated by the heat source will not only increase, but also the heat transfer efficiency will improve by the rapid temperature increase of the protruding portions. In particular, the reaction temperature of the reforming reaction unit 120 can rapidly reach the high temperature suitable for the steam reforming reaction of the butane, i.e., about 600° C. to 900° C.

Various embodiments of the invention will be described below. In the descriptions below, descriptions similar to embodiments described previously will be omitted.

Figure 2:
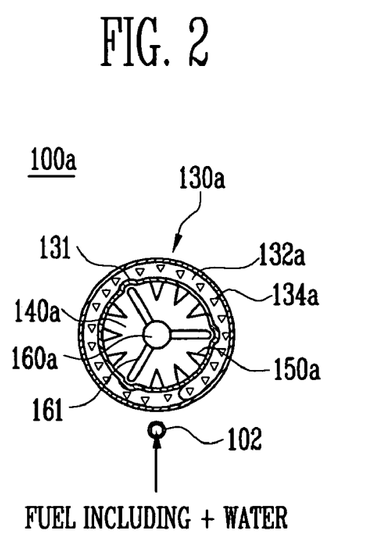

FIG. 2 is a view of a reformer according to another embodiment of the invention. FIG. 2 partially corresponds to a cross section taken along II-II line in FIG. 1.

Referring to FIG. 2, the reformer 100a includes at least one guide arm 161 and at least one corresponding guide groove 131.

More specifically, the reformer 100a comprises a preheating portion, a reforming reaction unit, a carbon monoxide processing unit 130a, a rugged portion 150a and a heat source 160a, which has an inlet 102 into which water flows. The preheating portion, the reforming reaction unit and the rugged portion 150a are substantially identical to the preheating portion, the reforming reaction unit and the rugged portion of the reformer 100 according to the embodiments above. The carbon monoxide processing unit 130a is substantially identical to the carbon monoxide processing unit of the reformer according to the embodiments above, except that the internal surface of the carbon monoxide processing unit 130a is provided with three guide grooves 131. The heat source 160a is substantially identical to the heat source of the reformer 100 according to the embodiments above, except that the heat source 160a has three guide arms 161 extending from its external surface and corresponding to the three guide grooves 131.

In this embodiment, the guide arms 161 extend in a radial direction from the heat source 160a, with the ends of each inserted into a corresponding guide groove 131. According to this construction, the heat source 160a is capable of a sliding or reciprocating motion in the hollow portion 140a of the carbon monoxide processing unit 130a for adjusting the location of the heat source 160a within the hollow portion 140a. For example, when initially operating the reformer 100a, most flames of the heat source 160a are positioned in the vicinity of the reforming reaction unit by moving the heat source 160a to rapidly preheat the preheating portion and the reforming reaction unit initially. Then the heat source 160a is moved toward the carbon monoxide processing unit 130a so that most flames of the heat source 160a heat the entire reformer to easily control the reaction temperature of each reaction zone.

According to one embodiment, heating the entire reformer by controlling the position of the heat source after rapidly preheating the preheating portion and the reforming reaction unit allows for the simple control of the reaction temperature of the carbon monoxide processing unit 130a within a desired range such as from 200° C. to 300° C., while rapidly increasing the reaction temperature of the reforming reaction unit to a high temperature such as from 600° C. to 900° C.

Figure 3:
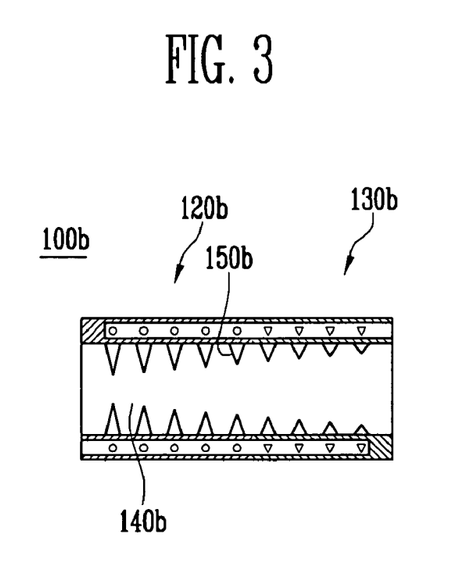

FIG. 3 is a partial cross sectional view showing a reformer according to another embodiment of the invention. FIG. 3 generally corresponds to the reforming reaction unit and the carbon monoxide processing unit of the reformer in FIG. 1.

Referring to FIG. 3, when the reformer 100b according to this embodiment of the invention is compared to reformers of previously disclosed embodiments, it is characterized in that the protruding heights of the protrusions that make up the rugged portion on the internal surfaces of the reforming reaction unit 120b and the carbon monoxide processing unit 130b toward the hollow portion 140b, becomes shorter from the reforming reaction unit to the carbon monoxide processing unit.

According to this construction of the rugged portion 150b, since it is possible to delay the discharge of the air heated by the flames generated from the heat source from the hollow portion 140b, the thermal efficiency of the reformer 100b can be improved.

Figure 4:
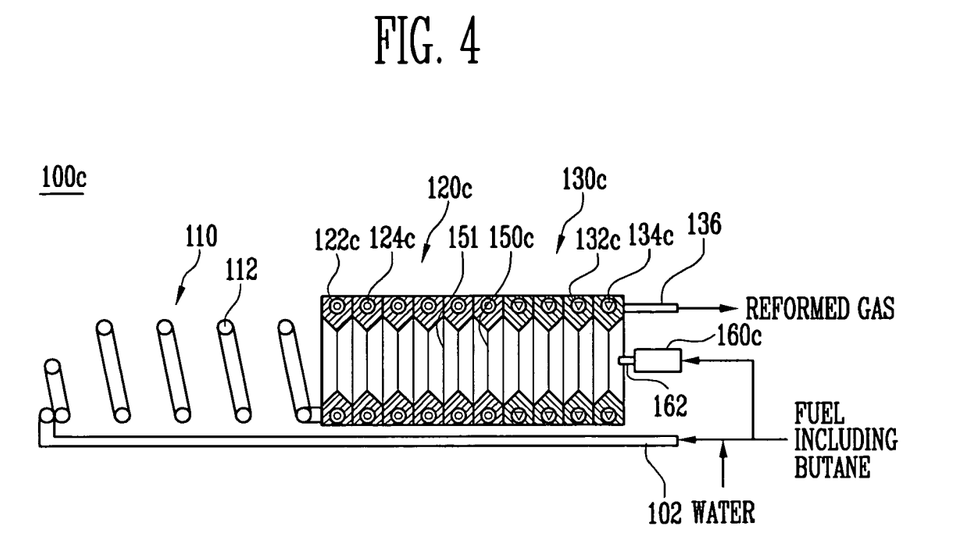

FIG. 4 is a view showing a reformer according to another embodiment of the invention.

Referring to FIG. 4, when the reformer 100c according to this embodiment of the invention is compared to prior embodiments, it is characterized in that the reformer 100c is constructed in a pipe-like shaped hollow cylinder by densely coiling a pipe in a spiral form, and providing a heat source 160c with a radiating tube 162.

More specifically, a pipe 151 comprises a protruding portion 150c corresponding to the aforementioned rugged portion. In other words, pipe 151 is wound into a pipe-like shape in which the protruding portion 150c corresponds to the rugged portion on the internal surface of the pipe-like shape. The reforming reaction unit and the carbon monoxide processing unit 130c comprise catalyst layers 124c, 134c, which are inserted and installed into two channels 122c, 132c, respectively and successively arranged in the pipe 151. According to the foregoing construction, the reforming reaction unit 120c and the carbon monoxide processing unit 130c can be simply manufactured by using pipe.

The heat source 160c comprises the radiating tube 162 capable of controlling the radiating position of the flames. In one embodiment, when using the radiating tube 162, the carbon monoxide processing unit 130c is installed in a position such that it is directly heated by most of the flames discharged from the radiating tube 162 by shortening the length of the radiating tube 162, or by installing the reforming reaction unit 120c such that it is directly heated by most of the flames discharged from the radiating tube 162 by lengthening the length of the radiating tube 162, thereby simplifying the temperature control of each reaction zone.

Figure 5:
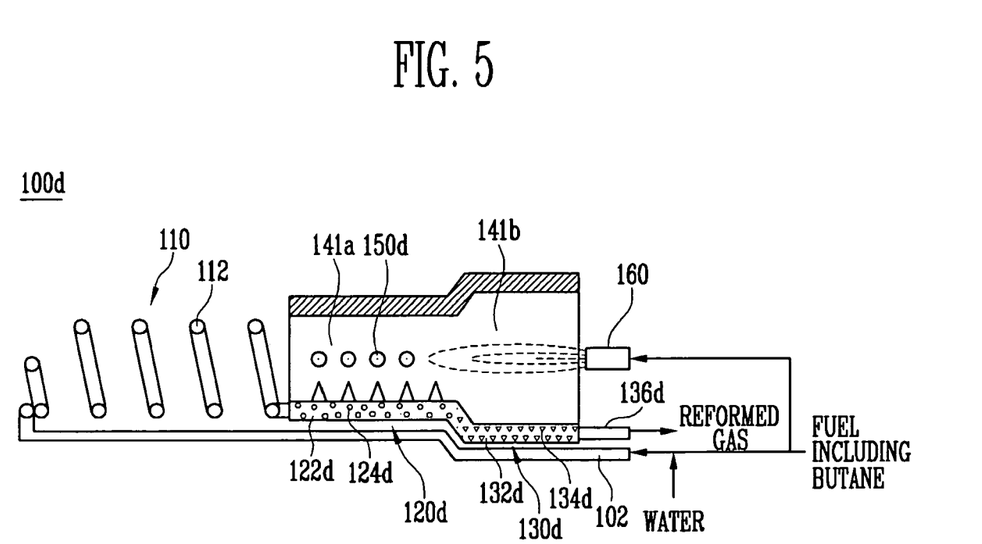

FIG. 5 is a view showing a reformer according to another embodiment of the invention.

Referring to FIG. 5, when the reformer 100d according to this embodiment of the invention is compared to reformers of the embodiments above, it is characterized in that it further comprises a stepped portion between a pipe shaped reforming reaction unit 120d and a pipe shaped carbon monoxide processing unit 130d extending therefrom. In one embodiment, the stepped portion is formed such that the sectional area/diameter of the hollow portion 141b of the carbon monoxide processing unit 130d is larger than that of the hollow portion 141a of the reforming reaction unit 120d.

In this embodiment, the reformer 100d is characterized in that the rugged portion 150d is partially installed only on a lower side of an internal surface of the reforming reaction unit 120d, depending on the arrangement of the reforming reaction unit 120d and the carbon monoxide processing unit 130d.

More specifically, if the sectional area of the hollow portion 141b of the carbon monoxide processing unit 130d is larger than that of the hollow portion 141a of the reforming reaction unit 120d, the temperature increase of the carbon monoxide processing unit 130d can be partially suppressed by drawing air through the hollow portion 141b of the carbon monoxide processing unit 130d. The thermal efficiency of the reforming reaction unit 120d is improved, and the reaction temperatures of the reforming reaction unit 120d and the carbon monoxide processing unit 130d, respectively, can be easily controlled by allowing most of the air to be heated by the flames radiated from the heat source 160 to remain in the hollow portion 141a of the reforming reaction unit 120d which includes the rugged portion 150d, and then discharged therefrom.

Additionally, in the reformer 100d of this embodiment, the reforming reaction unit 120d and the carbon monoxide processing unit 130d are installed only in a portion of the lower side of a pipe shaped structure. Each catalyst layer 124d, 134d suitable for the steam reforming reaction and the carbon monoxide reaction is inserted into channels 122d, 132d extending from the spiral pipe 112 of the preheating portion 110 into an outlet tube 136d. In this embodiment, exemplary catalysts for the catalyst layer for the steam reforming reaction include Ni/Al$_2$O$_3$, Ru/ZrO$_2$, Ru/Al$_2$O$_3$, highly dispersible Ru/CeO$_2$—Al$_2$O$_3$, and other catalysts such as Rh-based catalysts, etc. Suitable catalysts for the catalyst layer of the carbon monoxide processing unit include Cr$_2$O$_3$/Fe$_3$O$_4$, Cu/ZnO/Al$_2$O$_3$, etc.

Figure 6:
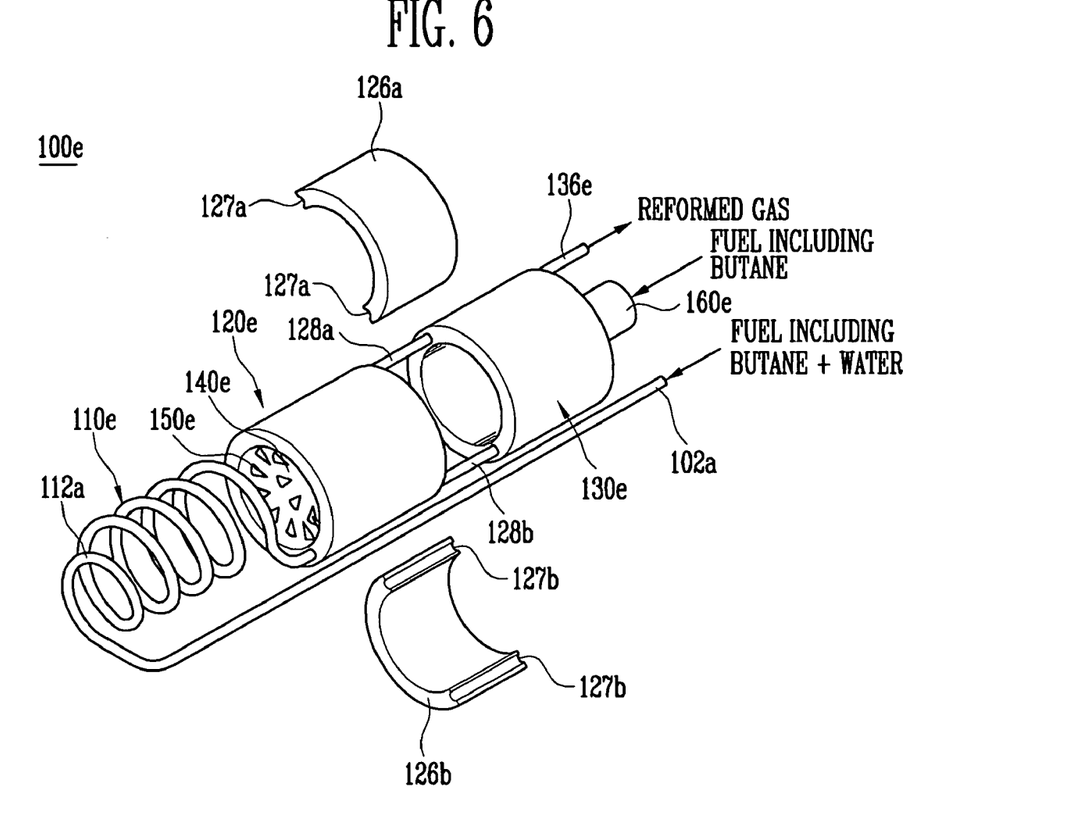

FIG. 6 is a partially exploded perspective view showing a reformer according to one embodiment of the invention.

Referring to FIG. 6, when the reformer 100e according to an embodiment of the invention is compared to the reformers in the embodiments above, it further comprises heat shielding portions 126a, 126b for partially shielding the heat transfer between the reforming reaction unit 120e and the carbon monoxide processing unit 130e.

More specifically, a preheating portion 110e is composed of a spiral pipe 112a extended from an inlet tube 102a for bringing in the butane fuel and water. The preheating portion 110e is a substantially concentric spiral with respect to the hollow portion 140e of the reforming reaction unit 120e. The fuel and water flowing into the reforming reaction unit 120e from the preheating portion 110e are reformed to a reformed gas rich in hydrogen via the steam reforming reaction. The reformed gas flows into an outlet tube 136e after its concentration of carbon monoxide is decreased by the carbon monoxide processing unit 130e.

In this embodiment, the heat shielding portions 126a, 126b are composed of materials with lower thermal conductivity than the materials of the reforming reaction unit 120e and the carbon monoxide processing unit 130e, and exemplary materials include metals or heat-resistant composite materials. The heat shielding portions 126a, 126b partially block heat energy, which is generated by the heat source 160e and transferred from the reforming reaction unit 120e to the carbon monoxide processing unit 130e. In an embodiment, the heat shielding portions 126a, 126b are positioned between the pipe shaped reforming reaction unit 120e and carbon monoxide processing unit 130e, but for manufacturing convenience, are installed in two pieces and the channel of the reforming reaction unit 120e is coupled with the channel of the carbon monoxide processing unit 130e by the connecting pipe 128a. In other words, both ends of the two pieces of the heat shielding 126a, 126b are provided with grooves 127a, 127b to which the connecting pipe 128a and a dummy pipe 128b are fitted so that they can be coupled between the reforming reaction unit 120e and the carbon monoxide processing unit 130e, and have a predetermined thickness and a ring shape.

According to the aforementioned construction, by the use of the rugged portion 150e, the reaction temperature of the reforming reaction unit 120e can be rapidly raised and the ambient temperature of the carbon monoxide processing unit 130e can be easily controlled at a reaction temperature relatively lower than the reaction temperature of the reforming reaction unit 120e.

Figure 7:
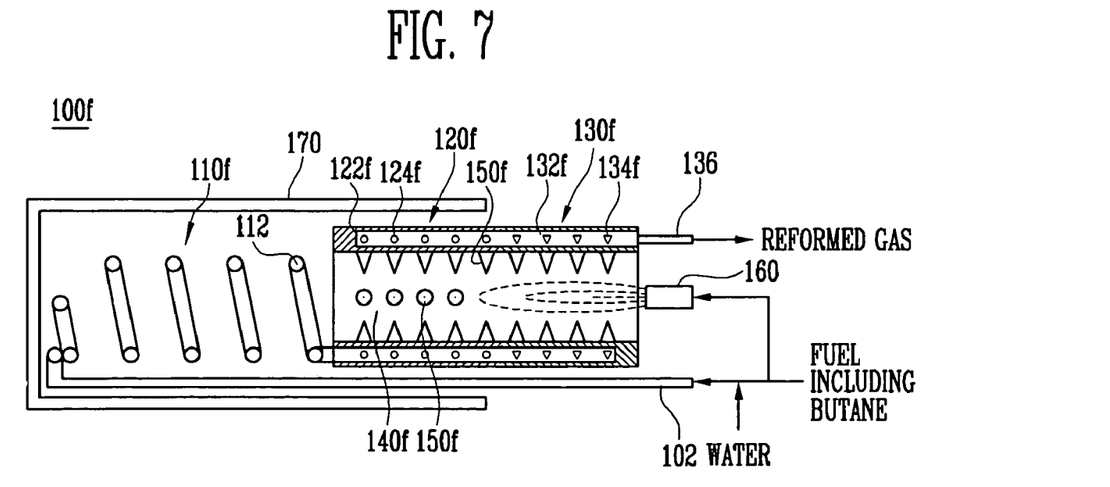

FIG. 7 is a view showing a reformer according to another embodiment of the invention.

Referring to FIG. 7, when the reformer 100f according to this embodiment is compared to the reformers in the prior embodiments, it is characterized in that it further comprises a cover 170 covering a preheating portion 110f and a reforming reaction unit 120f.

In the reformer 100f of this embodiment, butane fuel and water flow into the inlet tube 102 where they are mixed and preheated while passing near the spiral shaped pipe of the preheating portion 110f. The preheated fuel is steam-reformed by a reforming catalyst layer 124f while passing through the channel 122f of the reforming reaction unit 120f. The carbon monoxide in the reformed gas generated from the reforming reaction unit 120f is decreased by the catalyst layer 134f while passing the channel 132f of the carbon monoxide processing unit 130f. The heat supplied from a heat source 160 toward a hollow portion 140f is effectively transferred to the reforming reaction unit 120f and the carbon monoxide processing unit 130f by a rugged portion 150f of the internal surfaces of the reforming reaction unit 120f and the carbon monoxide processing unit 130f. The reformed gas with reduced carbon monoxide concentration, flows out through an outlet pipe 136.

In an embodiment, the cover 170 is composed of a metallic material or a heat-resistant composite material similar to the materials of the reforming reaction unit 120f. The cover 170 suppresses heat loss from the heat source 160 to the outside and serves to rapidly heat the reforming reaction unit 120 by forming an exhaust path around the reaction unit 120, in order to again heat the external surface of the reforming reaction unit 120.

In another embodiment, the cover 170 can be designed to cover only the preheating portion 110, or the portion up to the carbon monoxide processing unit 130f by controlling the size thereof. In this case, it is possible to precisely control the reaction temperature between the reforming reaction unit 120f and the carbon monoxide processing unit 130f by using the cover 170.

In an embodiment, the reformed gas flowing out from the reformer passes the carbon monoxide processing unit, for example, a preferential CO oxidation unit. In this case, the reformed gas may have a higher temperature than the range of the reaction temperatures of the preferential CO oxidation unit. In one embodiment, the carbon monoxide processing unit further comprises a temperature controller for detecting the reaction temperature and controlling the reaction temperature of the carbon monoxide processing unit to a desired temperature. In an embodiment, a cooler can be used as the temperature controller for lowering the temperature of the reformed gas. An example of a useful cooler comprises a fan with a driver for driving the fan.

Figure 8:
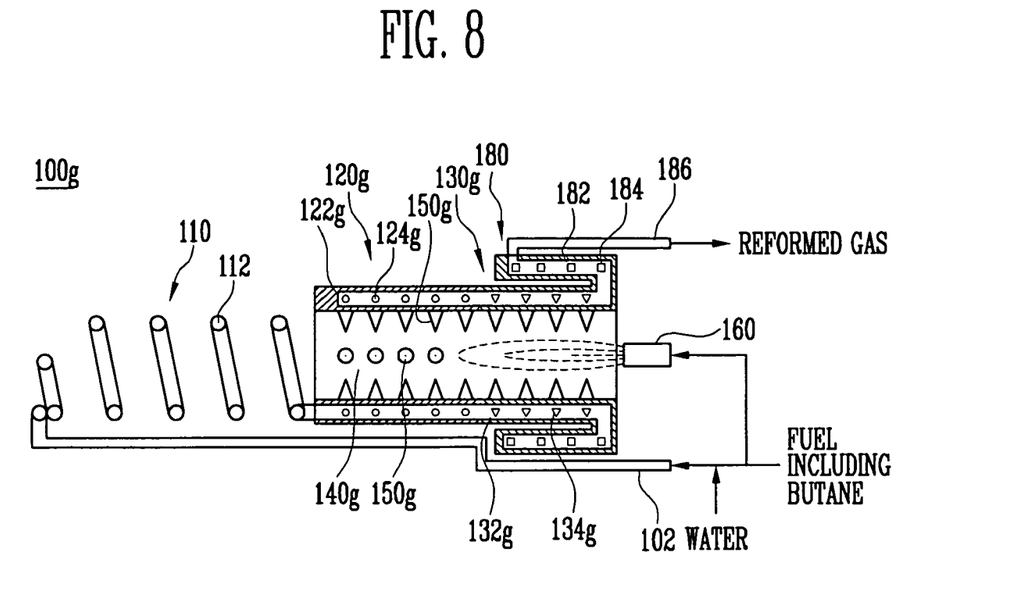

FIG. 8 is a view showing a reformer according to another embodiment of the invention.

Referring to FIG. 8, when the reformer 100g according to an embodiment of the invention is compared to the prior embodiments, the carbon monoxide processing unit is composed of a first carbon monoxide processing unit 130g and a second carbon monoxide processing unit 180. In this embodiment, the first carbon monoxide processing unit 130g is a shift reaction unit and the second carbon monoxide processing unit 180 is a preferential CO oxidation (PROX) unit.

In the reformer 100g of this embodiment, the butane fuel and water flowing into inlet tube 102 are mixed and preheated while passing the spiral shaped pipe of the preheating portion 110. The preheated fuel is stream-reformed by a reforming catalyst layer 124g while passing the channel 122g of the reforming reaction unit 120g. The carbon monoxide content of the reformed gas produced in the reforming reaction unit 120g is decreased by the catalyst layer 134g while passing the channel 132g of the first carbon monoxide processing unit 130g. At this time, the heat from a heat source 160 is effectively transferred to the reforming reaction unit 120g and the first carbon monoxide processing unit 130g by a rugged portion 150g of the internal surfaces of the reforming reaction unit 120g and the first carbon monoxide processing unit 130g. The carbon monoxide of the reformed gas from the first carbon monoxide processing unit 130g is reduced below a predetermined concentration by the catalyst layer 184 while passing the channel 182 of the second carbon monoxide processing unit 180. The reformed gas with the carbon monoxide reduced to below the predetermined concentration flows out through an outlet pipe 186.

In an embodiment, the second carbon monoxide processing unit 180 further decreases the carbon monoxide content of the reformed gas flowing from the first carbon monoxide processing unit 130g below a predetermined concentration. In an embodiment, the predetermined concentration means a concentration lower than the concentration capable of easily poisoning the catalyst of a polymer electrolyte fuel cell, for example below 10 ppm.

Also, in an embodiment, the second carbon monoxide processing unit 180 is pipe shaped and installed on the external surface of the first carbon monoxide processing unit 130g at a distance from the first carbon monoxide unit 130g, which is also pipe shaped. Herein, installing the second carbon monoxide processing unit 180 such that there is a gap between it and the external surface of the first carbon monoxide processing unit 130g suppresses the heat transfer from the reformed portion 120g or the first carbon monoxide processing unit 130g and induces natural cooling by air.

In one embodiment, the relatively low reaction temperature of the second carbon monoxide processing unit 180, which decreases the carbon monoxide content of the reformed gas by the preferential CO oxidation reaction can be more easily controlled at approximately 100~300° C. The preferential CO oxidation reaction of the second carbon monoxide processing unit 180 may be represented by the following reaction equation:

$$CO + \tfrac{1}{2}O_2 \leftrightarrow CO_2 \qquad \text{Reaction 3}$$

According to the aforementioned construction, the carbon monoxide content of the reformed gas is reduced to the desired concentration by using the first and second carbon monoxide processing units, installed integrally with the reformer portion, thereby providing a miniaturized reformer suitable for a steam-reforming a fuel such as butane.

Although describing separate technical features in the aforementioned embodiments, respective embodiments can be properly combined with applicable features of other embodiments.

Also, in an embodiment, the reformer prevents adverse effects such as coking of the catalyst layer in each reaction zone, etc., and properly maintains the ratio of steam to carbon (S/C) while properly maintaining the optimum reaction temperature, thereby maintaining catalyst efficiency.

Figure 9:
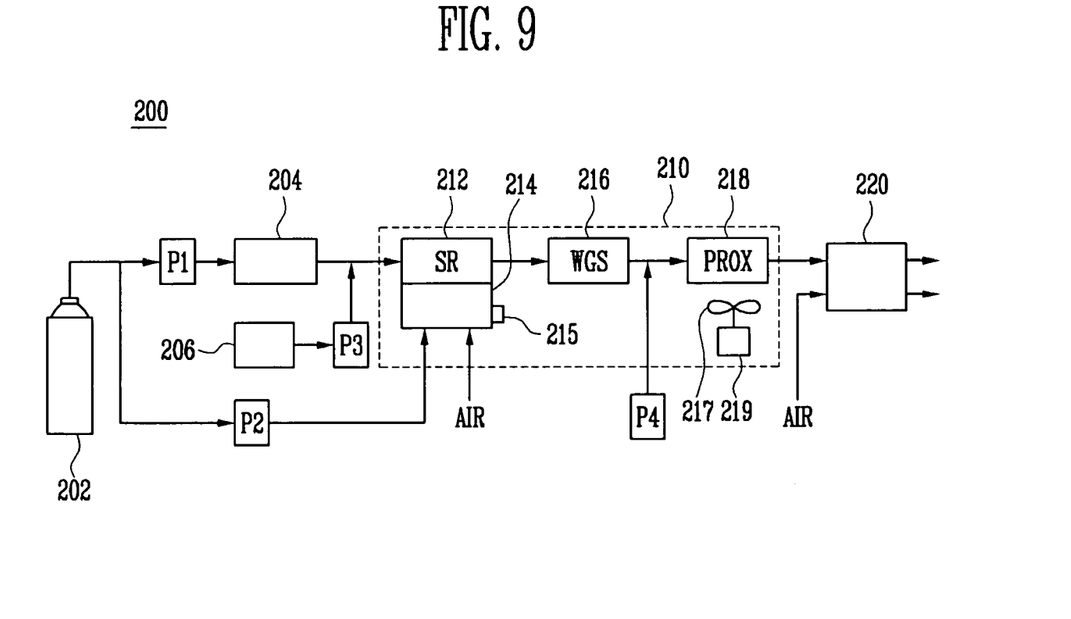
FIG. 9 is a block view of a fuel cell system employing a reformer according to the embodiments of the invention.

FIG. 9 is a block view showing an embodiment of a fuel cell system using a reformer according to any one of the embodiments of the invention. Accordingly, a detailed description of the reformer will be omitted.

Referring to FIG. 9, in one embodiment, a fuel cell system 200 comprises a fuel storing vessel 202, a desulfurizing device 204, a water tank 206, a reformer 210 and a fuel cell 220. In this embodiment, the fuel cell system 200 further comprises a plurality of pumps P1, P2, P3 and an air pump P4.

The fuel cell 220 comprises a power generation system to generate electric energy by electrochemically reacting hydrogen and oxygen. Herein, hydrogen is obtained through the reformer 210 from a fuel such as butane which is stored in the fuel storage vessel 202, and oxygen is obtained from air or an oxidizing agent. In one embodiment, the fuel cell 220 is a polymer electrolyte fuel cell.

In an embodiment, the fuel cell 220 comprises a stack type structure of a stack of fuel cells suitable for producing a high output. The stack of fuel cells comprises a plurality of membrane electrode assemblies (MEAs) which are stacked with separators between them. Each membrane electrode assembly includes an anode electrode and a cathode electrode attached to both sides of a polymer electrolyte membrane.

In the fuel cell 200 described above, if the anode electrode is supplied with fuel, i.e., reformed gas rich in hydrogen, the hydrogen causes an electrochemical oxidation reaction in the anode electrode, thereby being ionized and oxidized as hydrogen ions H+ and electrons e−. The ionized hydrogen ions move from the anode electrode to the cathode electrode through the polymer electrolyte membrane, and the electrons move to the cathode electrode through an external electric wire. The hydrogen ions' movement to the cathode electrode causes an electrochemical reduction reaction with oxygen supplied to the cathode electrode, generating reaction heat and water. Electric energy is generated by the movement of the electrons. The reaction of the fuel cell 220 described above may be represented by the following reaction equations:

$$\text{Anode electrode:} H_2 \rightarrow 2H^+ + 2e^-$$

$$\text{Cathode electrode:} \tfrac{1}{2}O_2 + 2H^+ + 2e^- \rightarrow H_2O$$

$$\text{Total reaction:} H_2 + \tfrac{1}{2}O_2 \rightarrow H_2O \qquad \text{Reaction 4}$$

In an embodiment, the fuel storage vessel 202 comprises a vessel storing fuel such as butane and may be provided as a butane can, etc., and can be a vessel capable of discharging fuel at a predetermined pressure. In another embodiment, the fuel storing vessel 202 includes an attachment which discharges a constant amount of fuel by opening the discharging valve installed at the fuel storage vessel 202.

The desulfurizing device 204 is a device for removing organic sulfur compound components that may be included in the butane fuel. Such organic sulfur compound components may include odorants commonly found in such fuels.

The operation of the fuel cell system 200 described above will be described as follows. In an embodiment, first, the controller (not shown) of the fuel cell system supplies the butane fuel stored in the fuel storage vessel 202 to the reforming reaction unit and the heat source in the reformer 210 by using two pumps P1, P2. The organic sulfur compound included in the fuel supplied to the reforming reaction unit 212 is removed by the desulfurizing device 204. The controller supplies the water stored in the water tank 206 to the reforming reaction unit 212 through the pump P3.

The heat source 214 generates heat by combusting the butane fuel and supplies the generated heat to the reforming reaction (SR) unit 212 and the water gas shift (WGS) reaction unit 216 (or shift reaction unit). The reforming reaction unit 212 generates the reformed gas with hydrogen from the butane fuel by a steam reforming reaction. The heat source 214 may be provided with an igniting device 215 for igniting the fuel.

When the reformed gas generated from the reforming reaction unit 212 flows into the shift reaction unit 216, the concentration of the carbon monoxide in the reformed gas is decreased to a predetermined concentration. The preferential CO oxidation (PROX) unit 218 oxidizes the carbon monoxide by using oxygen from the atmosphere supplied by the air pump P4, further decreasing the concentration of the carbon monoxide in the reformed gas. The reformed gas with a temperature higher than a desired reaction temperature can be routed to the aforementioned preferential CO oxidation unit 218. Therefore, the preferential CO oxidation unit 218 is provided with a fan 217 including a driving device 210 for lowering the temperature.

The fuel cell 220 receives a high quality reformed gas rich in hydrogen from the preferential CO oxidation unit 218 and generates electric energy by electrochemically reacting hydrogen from the reformed gas and oxygen from the atmosphere.

According to the construction described above, the fuel cell system can be rapidly driven by the pipe shaped reformer comprising the rugged portion. Furthermore, the high efficiency of a fuel cell system using a fuel such as butane can be achieved.

Although several embodiments of the invention have been shown and described, it may be appreciated by those skilled in the art that changes may be made without departing from the principles and spirit of the invention, the scope of which is defined in the claims and their equivalents.

What is claimed is:

1. A reformer for a fuel cell, comprising:
    a heat source adapted to generate heat by combustion of a fuel;
    a preheating portion arranged at a position to be preheated by heat from the heat source and adapted to mix and preheat a raw material and water;
    a reforming reaction section with a hollow portion defined by an internal surface, the internal surface having a rugged portion, the rugged portion adapted to be heated by the heat source; and
    a carbon monoxide processing unit extending from the reforming reaction unit, the hollow portion extending to the carbon monoxide processing unit, the hollow portion being further defined by an internal surface of the carbon monoxide processing unit, wherein the rugged portion further extends to the internal surface of the carbon monoxide processing unit;
    wherein the rugged portion comprises at least three protrusions affixed to or integral with the internal surface of the reforming reaction section and the internal surface of the carbon monoxide processing unit, the protrusions having differing heights, decreasing from the reforming unit to the carbon monoxide processing unit.

2. The reformer according to claim 1, wherein the reforming reaction unit comprises a spirally-wound pipe containing catalyst.

3. The reformer according to claim 1, wherein the heat source is slidably mounted within the hollow portion of the reforming reaction unit.

4. The reformer according to claim 1, wherein the carbon monoxide processing unit extends in a pipe shape from the reforming reaction unit and includes heat shielding materials.

5. The reformer according to claim 1, wherein the carbon monoxide processing unit extends in a pipe shape from the reforming reaction unit, wherein the diameter of the carbon monoxide processing unit is different from the diameter of the reforming reaction unit.

6. The reformer according to claim 5, wherein the diameter of the carbon monoxide processing unit is greater than the diameter of the reforming reaction unit.

7. The reformer according to claim 1, wherein the carbon monoxide processing unit comprises a shift reaction unit, and a CO oxidation unit.

8. The reformer according to claim 7, wherein the CO oxidation unit is extended in a pipe shape around an external surface of the reaction portion of the shift reaction unit.

9. The reformer according to claim 8, further comprising a cooler adapted to lower the reaction temperature of the CO oxidation unit.

10. The reformer according to claim 1, wherein the preheating portion comprises a spiral pipe positioned downstream of the hollow portion and facing the heat source.

11. The reformer according to claim 1, wherein the heat source comprises a burner adapted to discharge flames to the hollow portion.

12. The reformer according to claim 1, further comprising a cover covering the preheating portion and the reforming reaction unit.

* * * * *